(12) United States Patent
Kunitachi

(10) Patent No.: US 10,873,918 B2
(45) Date of Patent: Dec. 22, 2020

(54) WIRELESS COMMUNICATION TERMINAL AND COMMUNICATION CONTROL METHOD FOR ESTABLISHING EFFICIENT COMMUNICATION, AND CAPABLE OF SUPPRESSING A DELAY IN THE COMMUNICATION

(71) Applicant: Yazaki Corporation, Tokyo (JP)

(72) Inventor: Tadahide Kunitachi, Yokosuka (JP)

(73) Assignee: Yazaki Corporation, Tokyo (JP)

( * ) Notice: Subject to any disclaimer, the term of this patent is extended or adjusted under 35 U.S.C. 154(b) by 105 days.

(21) Appl. No.: 16/257,111

(22) Filed: Jan. 25, 2019

(65) Prior Publication Data

US 2019/0230608 A1 Jul. 25, 2019

(30) Foreign Application Priority Data

Jan. 25, 2018 (JP) .................................. 2018-010542
Jul. 11, 2018 (JP) .................................. 2018-131648

(51) Int. Cl.
*H04W 56/00* (2009.01)
*H04W 74/08* (2009.01)
(Continued)

(52) U.S. Cl.
CPC ........... *H04W 56/001* (2013.01); *H04W 4/48* (2018.02); *H04W 56/0045* (2013.01); *H04W 74/0808* (2013.01); *H04W 76/18* (2018.02)

(58) Field of Classification Search
CPC . H04W 4/48; H04W 56/001; H04W 56/0045; H04W 76/18; H04W 74/0808;
(Continued)

(56) References Cited

U.S. PATENT DOCUMENTS

2006/0234740 A1* 10/2006 Sakoda ............. H04W 72/0446
455/507
2011/0261751 A1* 10/2011 Ode ..................... H04B 7/0413
370/315
(Continued)

FOREIGN PATENT DOCUMENTS

JP 2010-287993 A 12/2010
JP 2014-027406 A 2/2014
JP 2014-225859 A 12/2014

*Primary Examiner* — Mewale A Ambaye
(74) *Attorney, Agent, or Firm* — Banner & Witcoff, Ltd.

(57) ABSTRACT

A wireless communication terminal in each node intercepts wireless communication among other nodes. When detecting failure in communication, the wireless communication terminal stores corresponding communication data on the node the wireless communication terminal belongs to, and relays the stored data by wireless communication. Transmission timing in each node is determined uniquely to the node, and data are transmitted periodically. In accordance with circumstances, the transmission timing in each node is changed to make the transmission timing in each data generation node earlier and to make the transmission timing in each data relay node later. Thus, a plurality of communication data are collected in data relay nodes. Each data relay node synthesizes a plurality of communication data, and performs relay transmission thereof.

5 Claims, 10 Drawing Sheets

(51) Int. Cl.
*H04W 4/48* (2018.01)
*H04W 76/18* (2018.01)

(58) Field of Classification Search
CPC ....... H04W 28/06; H04W 28/14; H04W 4/04; H04W 84/12
See application file for complete search history.

(56) References Cited

U.S. PATENT DOCUMENTS

| | | | |
|---|---|---|---|
| 2014/0092812 A1* | 4/2014 | Jang ................. | H04W 64/00 370/328 |
| 2014/0219185 A1* | 8/2014 | Etemad .............. | H04L 5/0073 370/329 |
| 2018/0199183 A1* | 7/2018 | Yamasaki ........... | H04W 4/40 |
| 2018/0279171 A1* | 9/2018 | Matsuo ............... | H03M 13/09 |

* cited by examiner

| Da | Db | Dc |
|---|---|---|
| DESTINATION | NUMBER OF AGGREGATED DATA | RELAY START WAIT |
| 1 | 1 | 1 |
| 2 | 1 | 1 |
| 7 | 4 | 4 |
| 7 | 3 | 3 |
| 7 | 3 | 2 |
| 7 | 2 | 2 |
| ⋮ | ⋮ | ⋮ |

17C

WIRELESS COMMUNICATION TERMINAL AND COMMUNICATION CONTROL METHOD FOR ESTABLISHING EFFICIENT COMMUNICATION, AND CAPABLE OF SUPPRESSING A DELAY IN THE COMMUNICATION

CROSS REFERENCE TO RELATED APPLICATIONS

This application is based on and claims priority from Japanese patent applications No. 2018-010542 filed on Jan. 25, 2018, and No. 2018-131648 filed on Jul. 11, 2018, the entire contents of which are incorporated herein by reference.

BACKGROUND OF THE INVENTION

1. Technical Field

The present invention relates to a wireless communication terminal and a communication control method which can be, for example, used in an on-vehicle wireless network.

2. Background Art

For example, a communication system according to Patent document JP-A-2014-225859 suggests a technique for transmitting data to a destination node quickly. That is, when there occurs a transmission request of data to a destination node, each node A to D transmits direct communication data to the destination node. In addition, when each node receives direct or proxy communication data addressed to the node, the node transmits ACK indicating the node has received the direct or proxy communication data. Further, when each node receives direct communication data not addressed to the node and then fails in receiving ACK, the node transmits proxy communication data included in the direct communication data. Furthermore, when each node transmits the proxy communication data and then receives ACK, the node transmits a proxy communication completion notification to a transmission source of the direct communication data.

A relay apparatus according to Patent document JP-A-2014-27406 suggests a technique for improving throughput of wireless communication compatibly with securing a real-time property when CAN data to be communicated between CAN nodes are related through a wireless network. That is, of CAN data the relay apparatus received, CAN data to be transmitted by wireless are stored in a buffer of the relay apparatus. When only a single CAN datum is stored in the buffer at a predetermined wireless transmission timing, the relay apparatus transmits the single CAN datum to another relay apparatus. When a plurality of CAN data are stored in the buffer, the relay apparatus aggregates the plurality of CAN data and transmits the aggregated data to another relay apparatus in a lump.

A communication apparatus according to Patent document JP-A-2010-287993 suggests a technique for transmitting data of route information etc. in a batch efficiently and in a short time. That is, in a network in which communication routes have a parent-child relation like a tree, a time to perform transmission processing is determined based on a transmission destination of a signal, and when the determined time has passed, a signal including a single datum or a plurality of data stored in a buffer is transmitted from a wireless transmission/reception portion.

As a specific example, description will be made below about an operation example in which a technique as shown in Patent document JP-A-2014-225859 is applied to a communication system having a network structure shown in FIG. 1.

The communication system shown in FIG. 1 includes five nodes N1 to N5 that can make communication. Here, the nodes N1 to N5 are wireless communication terminals respectively. For example, assume a situation in which the nodes N1 to N5 can communicate with one another using wireless communication routes connecting the nodes N1 to N5 as shown by the solid lines. However, communication is performed among the nodes N1 to N5 using wireless communication. Accordingly, the connection relation among them is not fixed. For example, the connection relation changes due to influence of a distance from one node to another or a change in radio wave environment. For example, the nodes N1 and N5 or the nodes N2 and N5 can communicate with each other directly by wireless. However, the communication cannot be established if the radio wave environment deteriorates. On the other hand, nodes adjacent to each other, that is, the nodes N1 and N3, the nodes N2 and N3, the nodes N3 and N4 or the nodes N4 and N5 are close to each other. Therefore, there rarely occurs a situation that wireless communication cannot be established between the adjacent nodes.

In the communication system shown in FIG. 1, operation will be described on an assumed situation in which data are transmitted from the node N1 to the node N5, and data are further transmitted from the node N2 to node N5.

The node N1 transmits data to the node N5 by wireless communication. Due to influence of the distance between the nodes or the radio wave environment, wireless communication can be established directly between the nodes N1 and N5 in some cases, but cannot be in the other cases. Therefore, for example, another node N3 overhears (eavesdrops or intercepts) the wireless communication and determines whether the direct communication between the nodes N1 and N5 is successful or not. When the node N3 recognizes the failure in the direct communication between the nodes N1 and N5, the node N3 stores the data transmitted by the node N1, and the node N3 transmits the stored data to the node N5 by wireless communication instead of the node N1. Also in this case, there is a possibility that the wireless communication between the nodes N3 and N5 is not successful. Therefore, another node N4 overhears the wireless communication, and determines whether the direct communication between the nodes N3 and N5 is successful or not. When the node N4 recognizes the failure in the direct communication between the nodes N3 and N5, the node N4 stores the data transmitted by the node N3, and the node N4 transmits the stored data to the node N5 by wireless communication instead of the node N3.

That is, even when direct communication cannot be established between the nodes N1 and N5, another node such as the node N3, N4 or the like relays corresponding data to the node N5 so that the data can be transferred between the nodes N1 and N5. Such control can be attained by the technique according to the Patent document JP-A-2014-225859.

On the other hand, in the communication system shown in FIG. 1, when communication data generated in the node N1 is being transferred as described above, another communication request may occur in another node N2. That is, first communication data generated in the node N1 and second communication data generated in the node N2 may interfere with each other on the network. In this case, according to typical control, communication about the second communication data is started after it is confirmed that all the communication about the first communication data has been completed, or processing for interrupting processing of the first communication data with communication about the second communication data is carried out on the way of the processing of the first communication data.

In the latter case, it is, for example, practical to use CSMA/CA (Carrier Sense Multiple Access with Collision Avoidance) as a communication protocol in each node. That is, when nodes hold data respectively, the nodes start communication individually, and communication is performed between communication nodes selected at random in each timing in accordance with CSMA/CA. FIG. 2 shows an operation example typically assumed in this case. Operations at time instants t1 to t6 in FIG. 2 will be described below.

t1: A communication request occurs in the node N1, and communication data D1 therefor are transmitted to the destination node N5. In this case, the node N1 fails in communication so that the communication data D1 cannot reach the node N5. Here the neighboring node N3 of the node N1 overhears a wireless signal of the communication data D1, and holds data D1A the same as the communication data D1 for which the node N1 has failed in communication.

t2: The node N3 starts communication to transfer the held communication data D1A to the destination node N5. Also in this case, the node N3 fails in communication so that the data cannot reach the destination node N5. Here the neighboring node N4 of the node N3 overhears a wireless signal of the communication data D1A, and holds data D1B the same as the communication data D1A for which the node N3 has failed in communication.

t3: The node N4 starts communication to transfer the held communication data D1B to the destination node N5. At the same time, a new communication request occurs in the node N2, and the node N2 starts transmitting communication data D2 therefor. However, since communication of the node N4 is being carried out at this time, communication of the node N2 is prevented in order to avoid interference. Therefore, the node N2 delays the timing of the communication of the communication data D2 in accordance with CSMA/CA.

t4: After delaying the transmission timing, the node N2 transmits the communication data D2 to the destination node N5. The node N2 fails in communication so that the communication data D2 cannot reach the node N5. Here the neighboring node N3 overhears a wireless signal of the communication data D2, and holds data D2A the same as the communication data D2 for which the node N2 has failed in communication.

t5: The node N3 starts communication to transfer the held communication data D2A to the destination node N5. However, the node N3 fails in communication so that the communication data D2A cannot reach the node N5. Here the neighboring node N4 overhears a wireless signal of the communication data D2A, and holds data D2B the same as the communication data D2A for which the node N3 has failed in communication.

t6: The node N4 transmits the held communication data D2B to the destination node N5. Thus, the data the same as the communication data D2 reaches the destination node N5.

In the aforementioned manner, when communication data generated in a plurality of nodes respectively have to be transmitted concurrently, a delay occurs, for example, in the transmission of the communication data D2 shown in FIG. 2.

On the other hand, the technique according to Patent document JP-A-2014-27406 assumes a system which includes a plurality of CAN nodes, and a plurality of relay devices having a wireless communication function capable of connecting the CAN nodes to one another by wireless. When direct communication to a CAN node serving as a communication partner cannot be established, it is assumed that communication is secured using another CAN node within a network, and wireless communication is further used for communication among the nodes.

In such a network form, there is a problem that communication for relay increases to generate a delay. A technique for solving the problem is suggested in Patent document JP-A-2014-27406. That is, when data are generated in a CAN node, the data are transferred to a wireless terminal, and the wireless terminal sends the data to a relay wireless terminal. The relay wireless terminal checks whether there are data from another CAN node connected thereto. When there are data, the relay wireless terminal synthesizes (aggregates) the data received from the wireless terminal with the data from the CAN node, and transmits the synthesized data to another wireless terminal. Thus, data from a plurality of CAN nodes can be transmitted concurrently. On the other hand, when there are no data from any CAN node connected to the relay wireless terminal, the relay wireless terminal transfers the data to an intended CAN node immediately using wireless communication without holding data from any CAN node connected to the relay wireless terminal. Thus, data from any CAN node can be transferred without any delay.

On the other hand, Patent document JP-A-2010-287993 suggests that connections among nodes have a hierarchical structure, and data from a plurality of lower-layer terminals are bundled (aggregated) to reduce the volume of communication traffic to an upper layer when communication from the lower layer to the upper layer is carried out.

However, when a plurality of data are synthesized in a relay node as in Patent document JP-A-2014-27406 or Patent document JP-A-2010-287993, timing of one communication is delayed due to another communication. Therefore, it is highly likely to cause a delay in communication.

In addition, in the technique according to Patent document JP-A-2014-27406, when the frequency with which data are generated in each terminal is sparse, data cannot be collected in a relay terminal. In addition, when each terminal has a sufficiently long operation period or when the number of terminals is small within a network, the communication frequency is lowered, and each communication is established independently. Thus, sufficient effect cannot be obtained.

In addition, in the technique according to Patent document JP-A-2010-287993, a parent-child structure has to be built in advance among terminals performing communication in order to use the hierarchical structure. Further, due to the hierarchical structure, data cannot be aggregated in communication from an upper layer to a lower layer.

SUMMARY

The present invention has been developed in consideration of the aforementioned situation. An object of the invention is to provide a wireless communication terminal and a communication control method capable of reducing the volume of traffic sent onto a network to thereby establish efficient communication, and capable of suppressing a delay in the communication.

In order to attain the foregoing object, a wireless communication terminal and a communication control method according to the invention are characterized by the following configurations (1) to (7).

(1) A wireless communication terminal that includes a function of receiving a wireless signal, a function of transmitting a wireless signal, and a function of relaying contents of a received wireless signal and resending the contents through a wireless signal, and that can be connected to a predetermined wireless network, the wireless communication terminal including:

a data synthesizing portion that synthesizes a plurality of data and sends the synthesized data when the data should be relayed to one and the same destination; and a transmission timing management portion that transmits data in accordance with a transmission timing determined uniquely to the terminal, and changes the transmission timing to promote concentration of predetermined data on a data relay node on the wireless network.

(2) A wireless communication terminal according to the aforementioned configuration (1), wherein:

when data addressed to another node and needing to be relayed are received and stored on a node the transmission timing management portion belongs to, the transmission timing management portion changes the transmission timing and makes length of a transmission wait time in the data relay node longer than at least that in a data generation node.

(3) A wireless communication terminal according to the aforementioned configuration (1), wherein:

the node the transmission timing management portion belongs to is a data generation node that do not have to be relayed, and the node the transmission timing management portion shifts the transmission timing forward when detecting failure in wireless communication between another first node and another second node.

(4) A wireless communication terminal according to the aforementioned configuration (1), further including:

a data buffer that temporarily holds corresponding received data as a target to be relayed when failure in wireless communication between another first node and another second node is detected.

(5) A wireless communication terminal according to the aforementioned configuration (1), further including:

an actual value recording portion that records and holds past actual values relating to at least one of the number of data synthesized by the data synthesizing portion, the number of generated data, and a transmission wait time in the transmission timing management portion; wherein:

the transmission timing management portion dynamically reflects the actual values held by the actual value recording portion and a change thereof on at least one of length of the transmission wait time and a reference value of the number of data to be synthesized by the data synthesizing portion.

(6) A communication control method for controlling a wireless network formed by at least three wireless communication terminals including at least a first node, a second node and a third node, the communication control method including the steps of:

making the third node intercept wireless communication between the first node and the second node;

temporarily holding, on the third node, corresponding communication data as a target to be relayed when the third node detects failure in wireless communication between the first node and the second node;

changing a transmission timing of the third node holding the communication data; and making the third node synthesize and transmit a plurality of communication data held by the third node when the communication data are addressed to one and the same destination.

(7) A communication control method according to the aforementioned configuration (6), further including the steps of:

recording and holding past actual values relating to at least one of the number of data synthesized in the third node, the number of generated data, and a transmission wait time; and dynamically reflecting the actual values and a change thereof on at least one of length of the transmission wait time in the third node and a reference value of the number of data to be synthesized.

According to the wireless communication terminal having the aforementioned configuration (1), the transmission timing of each node is changed suitably in accordance with circumstances by control of the transmission timing management portion. Accordingly, predetermined data can be concentrated on the data relay node on the wireless network. That is, data to be synthesized by the data relay node are easily collected in the data relay node so that the data can be synthesized efficiently, and excessive increase of wait time can be avoided. Thus, the volume of traffic sent onto the network can be reduced.

According to the wireless communication terminal having the aforementioned configuration (2), the transmission timing of a data relay node holding communication data to be relayed is automatically adjusted so that the transmission wait time can be made longer than that in a data generation node. Accordingly, in the data relay node, there increase opportunities to intercept communication data transmitted by other data generation nodes. When another node fails in communication, corresponding communication data can be added to relay data to be synthesized. Accordingly, the frequency with which the data relay node synthesizes a plurality of communication data increases so that the volume of traffic sent onto the network can be reduced efficiently. In addition, the transmission wait time in the data generation node can be shortened. Thus, a delay in communication can be suppressed.

According to the wireless communication terminal having the aforementioned configurations (3) or (4), it is easy to transfer corresponding communication data due to proxy communication of another data relay node when another first node and another second node fail in wireless communication therebetween.

According to the wireless communication terminal having the aforementioned configuration (5) and the communication control method having the aforementioned configuration (7), the relay transmission wait time can be automatically adjusted suitably in accordance with the actual condition that data to be relayed are generated. In addition, it is not necessary to wait for a certain time until a certain amount of data are accumulated. Accordingly, in the condition that data are not generated so much, relay transmission can be started in a short time. On the other hand, in an environment where a large amount of data are generated, the number of data to be synthesized during relay can be increased to establish efficient communication.

According to the communication control method having the aforementioned configuration (6), it is possible to deliver corresponding communication data to a destination efficiently due to relay and proxy transmission processing of the third node when the first node and the second node fail in wireless communication therebetween. In addition, the third node transmits the communication data after synthesizing a plurality of communication data addressed to the same destination. Thus, the volume of traffic sent onto the network can be reduced efficiently. Further, the transmission timing of the third node is changed in accordance with circumstances. Thus, a plurality of communication data to be synthesized can be promoted to be concentrated on the third node. In addition, the transmission wait time in the data generation node can be shortened. Thus, a delay in communication can be suppressed.

In a wireless communication terminal and a communication control method according to the invention, the volume of traffic sent onto a network can be reduced so that efficient communication can be established, and a delay in communication can be suppressed.

The invention has been described briefly above. The further details of the invention will be made clearer if the following Mode for Carrying Out the Invention (hereinafter referred to as "embodiment") is read through with reference to the accompanying drawings.

DETAILED DESCRIPTION OF EMBODIMENTS

Specific embodiments of the invention will be described below with reference to the drawings.

First Embodiment

<Configuration Example of Communication System the Invention is Applied To>

Although not illustrated, a communication system in which the invention is carried out is configured as a system which is, for example, mounted on a vehicle so as to establish communication on the vehicle. Not to say, the communication system can be configured as a communication system for another application than the vehicle.

In a vehicle, various electric components are generally disposed in a dispersed state within a comparatively narrow space. For example, various switches, sensors, lamps, motors, heaters, electronic control units (ECUs), etc. are disposed at various places, and they have to be connected to one another through communication lines or the like. When wireless communication is used in place of such wired connection, the communication lines can be removed. Thus, the structure of a wire harness can be simplified to reduce the weight thereof or reduce the cost thereof.

However, when a large number of wireless communication terminals are dispersed and disposed at various places on a vehicle, wireless communication between two of the terminals is affected by the distance between the two or a change in wireless communication environment. Therefore, wireless communication between a terminal serving as a transmission source of data and a terminal serving as a destination is successful in some cases, but unsuccessful in the other cases.

Figure 1:
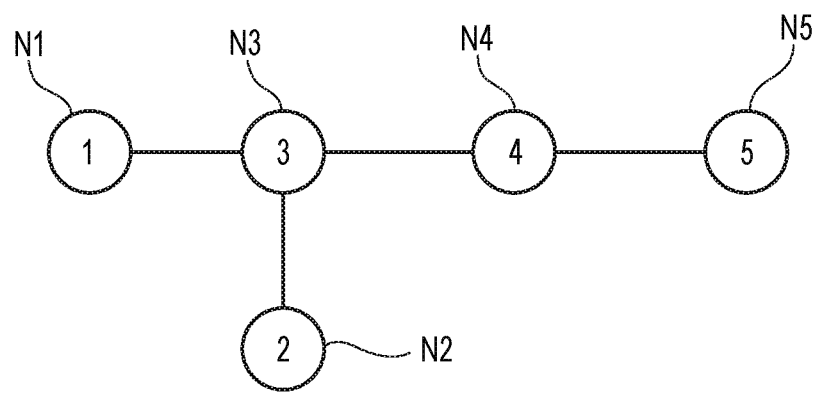
FIG. 1 is a block diagram illustrating a configuration example of a wireless network of a communication system.

Therefore, a wireless network as shown in FIG. 1 which has been described above is, for example, formed on the vehicle. That is, wireless communication terminals are disposed in positions of nodes N1 to N5 shown in FIG. 1 respectively, so that wireless communication can be established among the nodes N1 to N5. For example, electric components such as switches or sensors are connected to the wireless communication terminals in the nodes N1 and N2 respectively, and an ECU for controlling the electric components is connected to the wireless communication terminal in the node N5.

Here, for example, assume that the node N1 transmits a wireless signal. The node N5 can receive the wireless signal in some cases, but cannot receive the wireless signal in the other cases. When direct communication cannot be established between the nodes N1 and N5, another communicative node such as the node N3 or N4 relays data and substitutes for the node N1 to transmit the data. Thus, communication data sent by the node N1 can be delivered to the destination node N5.

Figure 2:
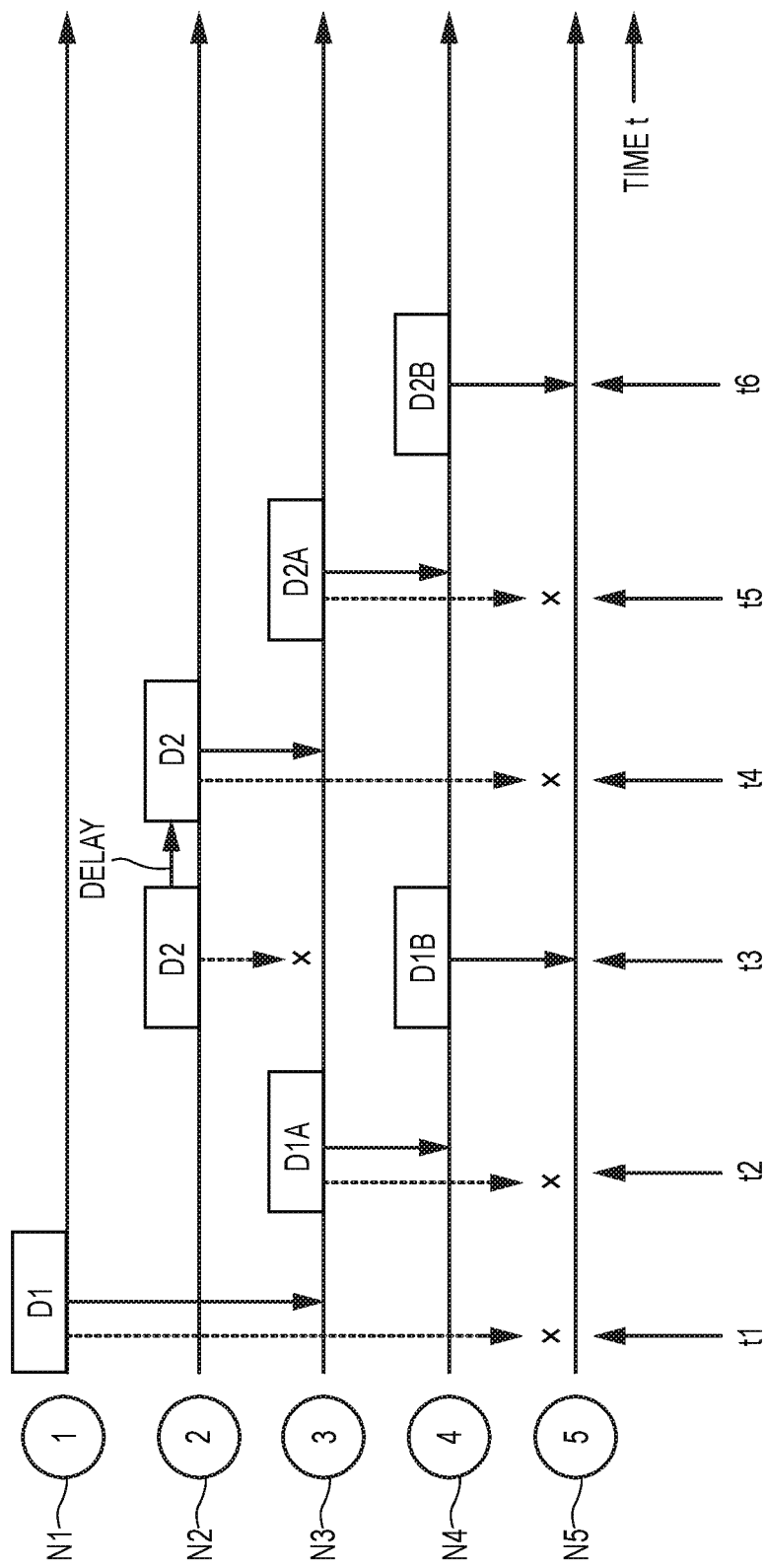
FIG. 2 is a time chart showing an operation example of a communication system using an assumed typical communication control method.

When a large number of wireless communication terminals are disposed within a narrow space such as a vehicle, there is a fear that the volume of traffic sent onto the network may increase due to relay operation of each terminal, or a delay in communication may occur as shown in FIG. 2. However, when the invention is used, it is possible to suppress increase in traffic sent onto the network, and it is also possible to suppress a delay in communication.

<Operation Example of Communication System when the Invention is Carried Out>

Figure 3:
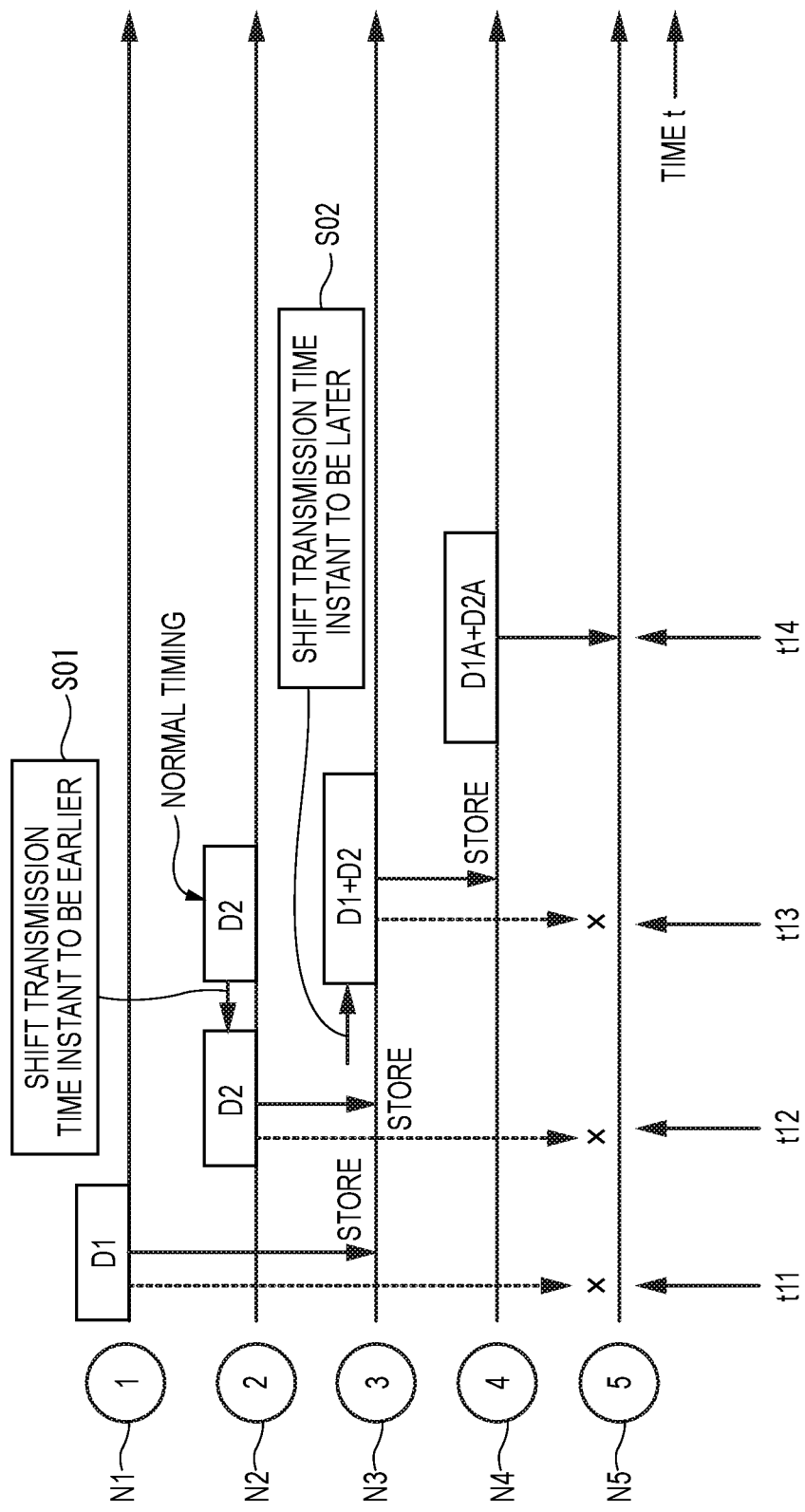
FIG. 3 is a time chart showing an operation example of a communication system using wireless communication terminals and a communication control method according to a first embodiment of the invention.

FIG. 3 shows an operation example of a communication system to which wireless communication terminals and a communication control method according to the first embodiment of the invention are used. Operations of the nodes N1 to N5 at respective time instants shown in FIG. 3 will be described below.

t11: A data transmission request occurs in an input of the wireless communication terminal located in the node N1, and the node N1 transmits corresponding communication data D1 to the node N5 using a wireless signal. In this case, due to the influence of the distance or the wireless communication environment, the node N1 fails in communication so that the wireless signal cannot directly reach the node N5. At the same time, the neighboring node N3 overhears the wireless signal sent by the node N1. When detecting the failure in communication in the node N1, the node N3 stores (temporarily holds) the contents of the received data D1 in its internal buffer.

t12: A data transmission request occurs in an input of the wireless communication terminal located in the node N2, and the node N2 transmits corresponding communication data D2 to the node N5 using a wireless signal. Here, normally, the node N2 transmits the communication data D2 (near t13) after a sufficient time has passed since the communication of the communication data D1 at the time instant t11 was terminated. However, in the example of FIG. 3, due to processing of Step S01, the time instant when the node N2 transmits the communication data D2 is shifted to be earlier so that the node N2 transmits the communication data D2 at a time instant t12. However, the node N2 fails in communication so that the wireless signal of the communication data D2 cannot directly reach the node N5. At the same time, the neighboring node N3 overhears the wireless signal sent by the node N2. When detecting the failure in communication in the node N2, the node N3 stores (temporarily holds) the contents of the received data D2 in its internal buffer.

t13: On the other hand, after the communication data D1 are stored at the time instant t11, the timing of transmission in the node N3 is shifted to be later than normally due to the processing of Step S02 because transmission of the data D2 in the node N2 has been already started. Therefore, the node N3 transmits data to be relayed at the time instant t13 after the transmission in the node N2. In addition, a plurality of communication data D1 and D2 have been collected in the node N3 before the time instant t13. Accordingly, the node N3 synthesizes the plurality of communication data D1 and D2 addressed to the same destination, for example, as a single frame or as a single packet. The node N3 transmits the synthesized communication data (D1+D2) to the node N5 using a wireless signal at the time instant t13. However the node N3 fails in communication so that the wireless signal of the communication data (D1+D2) cannot directly reach the node N5. At the same time, the neighboring node N4 overhears the wireless signal sent by the node N3. When detecting the failure in communication in the node N3, the node N4 stores (temporarily holds) the contents of the received communication data as communication data (D1A+D2A) in its internal buffer.

t14: The node N4 transmits the communication data (D1A+D2A) held as a result of overhearing to the destination node N5 using a wireless signal. The distance between the nodes N4 and N5 is so short that the wireless signal from the node N4 can reach the node N5. That is, the node N5 can simultaneously receive both the communication data D1 and D2 generated in a plurality of data generation nodes N1 and N2 at the time instant t14.

The adjustment of the transmission timing in each Step S01, S02 shown in FIG. 3 can be, for example, achieved by adjustment of a back-off time in a CSMA/CA protocol. Specifically, the back-off time of the node N2 is set at a minimum value (0) in Step S01, and the back-off time of the node N3 is set at random within a range of sufficiently large values (for example, 32 or more) in Step S02.

That is, the transmission wait time in the data generation node such as the node N1 or N2 is shortened, while the transmission wait time in the data relay node such as the node N3 or N4 is elongated. Thus, the node N2 can start transmission with priority before the node N3 starts relay transmission. As a result, it is possible to avoid a delay in communication in the data generation node. In addition, a plurality of communication data tend to be collected in the data relay node before the data relay node starts transmission. Thus, the frequency with which a plurality of communication data are collected and transmitted as a single packet is increased so that the volume of traffic sent onto the network can be reduced on a large scale.

Incidentally, as for a node which is fixed as a data generation node, the back-off time may be, for example, fixed to a minimum value in advance, and the processing of Step S01 may be removed. As for a node which may be changed over between a data generation node and a data relay node in accordance with circumstances, it is important to change over the back-off time when the node is changed over therebetween.

In addition, the method for adjusting the transmission timing in each Step S01, S02 is not limited to the adjustment of the back-off time in the CSMA/CA protocol. For example, the data relay node which has acquired communication data from a data generation node may wait for communication from another data generation node, and start relay transmission if a plurality of communication data have been collected. In this case, when the number of collected communication data reaches a predetermined number or when a certain wait time N has passed, the data relay node starts relay transmission. Here, the wait time N is, for example, determined by a product of the maximum number of communication data that can be collected and the communication time per one time.

<Operation Example of Wireless Communication Terminal>

Figure 4:
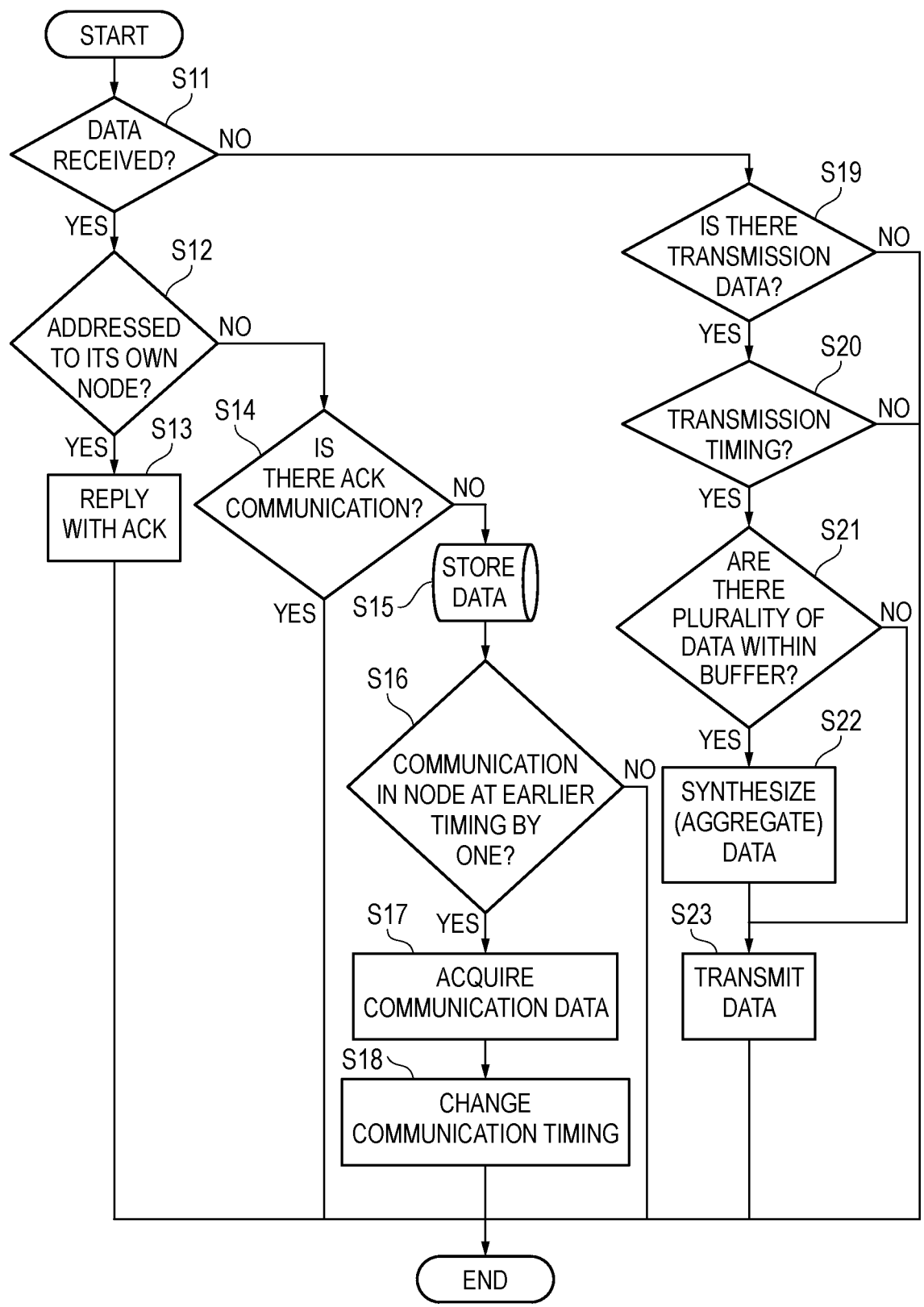
FIG. 4 is a flow chart showing a main operation example in the wireless communication terminal according to the first embodiment of the invention.

FIG. 4 shows an example of main operation in each wireless communication terminal according to the first embodiment of the invention. That is, wireless communication terminals carrying out the operation of FIG. 4 are, for example, connected to positions of the nodes N1 to N5 shown in FIG. 1 respectively so as to form a communication system. Thus, the characteristic operation shown in FIG. 3 can be achieved.

The operation shown in FIG. 4 includes functions as reception operation, transmission operation and relay operation of a wireless signal in a wireless communication terminal. Accordingly, the wireless communication terminal executing the operation of FIG. 4 can be used in either a data generation node such as the node N1 or N2, a data reception node such as the node N5, or a data relay node such as the node N3 or N4 as shown in FIG. 1. The operation of FIG. 4 will be described below.

When the wireless communication terminal receives communication data addressed to the node the wireless communication terminal belongs to, from another node by wireless communication, the wireless communication terminal executes processings of S11, S12 and S13 sequentially, and replies to the transmission source with an acknowledgement (ACK) indicating that reception of the communication data is successful (S13).

On the other hand, when the wireless communication terminal receives communication data addressed to a node other than the node the wireless communication terminal belongs to, from another node by wireless communication, the wireless communication terminal executes processings of S11, S12 and S14 sequentially. When an acknowledgement (ACK) from the destination node of the communication data is detected in S14, this process is terminated. When no acknowledgement is detected, the communication is regarded as unsuccessful, and the process moves to processing of S15. In S15, the wireless communication terminal stores the communication data received in S11 from intercepted wireless communication of another node, into a communication data buffer 15 which will be described later. The data stored here will be used for relay later.

In addition, when the transmission source of the communication data received in S11 is a node having an earlier timing by one, the wireless communication terminal acquires communication data (communication data D2) in S17, and shifts timing of the node the wireless communication terminal belongs to, to be earlier in S18. For example, as shown in Step S01 of FIG. 3, the transmission time instant of the communication data D2 in the node N2 is shifted to be earlier than its normal timing, and the communication data D2 are transmitted at the time instant t12. On the other hand, in the node N3, processings of S11, S12, S14 and S15 are executed sequentially in the same manner as in the node N2. However, the transmission source of the communication data received in S11 is not a node having an earlier timing by one. Therefore, when processing of S16 is executed, the node S3 terminates the process. Incidentally, Steps S17 and S18 may be performed in reverse order.

On the other hand, when communication data to be transmitted or relayed are held in the communication data buffer 15, the wireless communication terminal the communication data buffer 15 belongs to executes processings of S11, S19 and S20 sequentially. At the transmission timing of the node the wireless communication terminal belongs to, the wireless communication terminal moves from S20 to S21. When a plurality of communication data are held in the communication data buffer 15, the wireless communication terminal moves from S21 to S22, in which the wireless communication terminal synthesizes (aggregates) a plurality of communication data addressed to one and the same destination so as to arrange the plurality of communication data into a single packet or the like. The synthesized packet is used as relay data to be transmitted this time. Then the wireless communication terminal transmits a wireless signal of the corresponding communication data (synthesized packet) to the destination in the next Step S23.

<Configuration Example of Wireless Communication Terminal>

Figure 5:
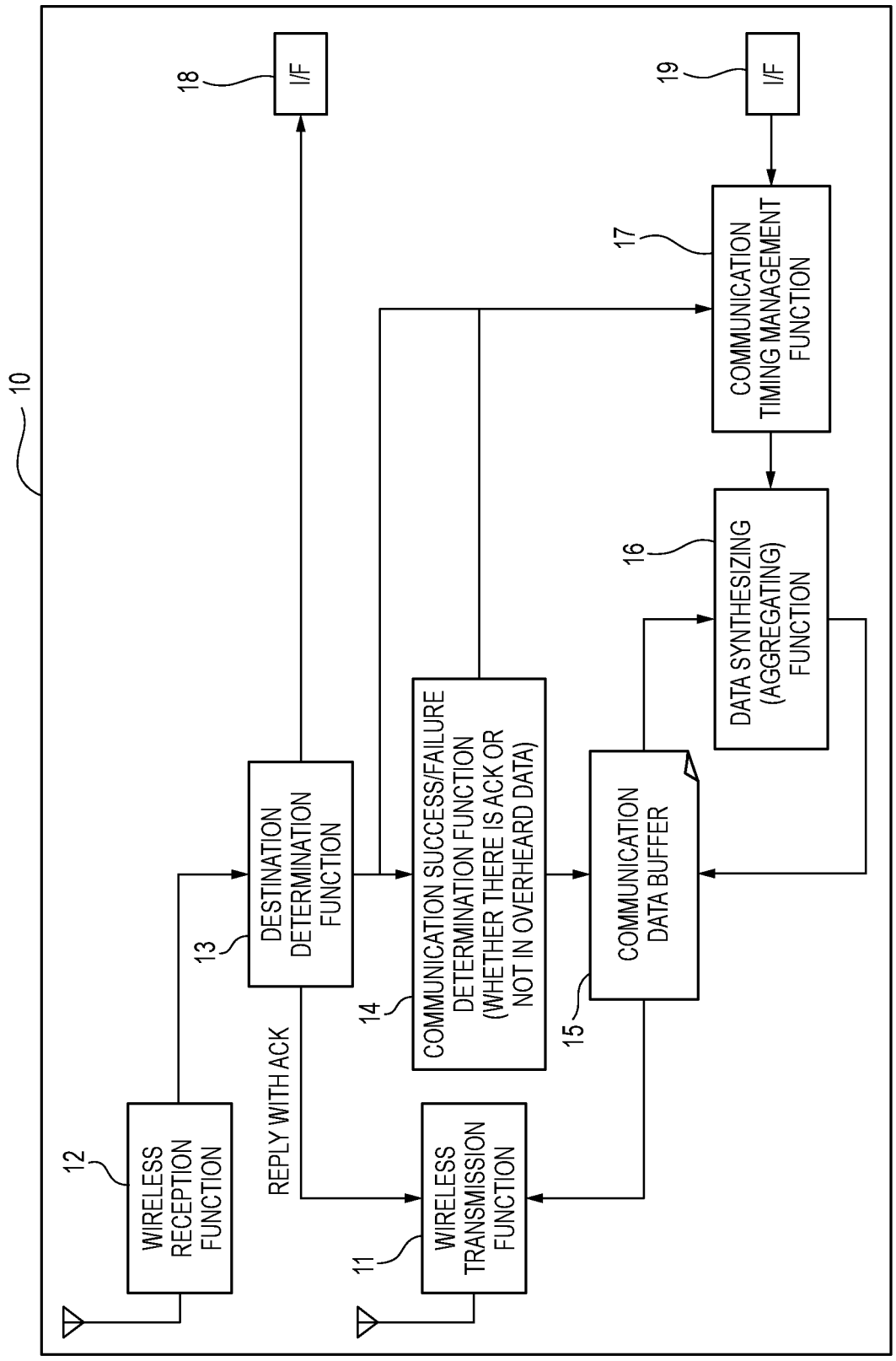
FIG. 5 is a block diagram showing main constituent elements of the wireless communication terminal according to the first embodiment of the invention.

FIG. 5 shows main constituent elements of the wireless communication terminal 10 according to the first embodiment of the invention. When the constituent elements shown in FIG. 5 are mounted on the wireless communication terminal 10, the operation of the terminal shown in FIG. 4 and the characteristic operation of the communication system shown in FIG. 3 can be achieved.

The wireless communication terminal 10 shown in FIG. 5 has a wireless transmission function 11, a wireless reception function 12, a destination determination function 13, a communication success/failure determination function 14, a communication data buffer 15, a data synthesizing function 16, a communication timing management portion (communication timing management function) 17, and interfaces (I/Fs) 18 and 19. Each of these function blocks can be implemented by hardware such as a dedicated electronic circuit, software executed by a microcomputer for control, or a combination thereof.

The wireless transmission function 11 is used in a case where communication data in the node the wireless transmission function 11 belongs to is transmitted by wireless communication or in a case where communication data received from another wireless communication terminal 10 and addressed to another node is relayed and sent out.

The wireless reception function 12 is used in order to receive communication data sent from another node using a wireless signal and addressed to the node the wireless reception function 12 belongs to or in order to intercept (overhear) a wireless signal addressed to another node. The destination determination function 13 has a function of distinguishing communication data addressed to the node the destination determination function 13 belongs to from communication data addressed to another node with reference to information about a destination of communication data included in a wireless signal received by the wireless reception function 12.

When wireless communication addressed to another node is intercepted (overheard), the communication success/failure determination function 14 determines whether the communication is successful or not. For example, the communication success/failure determination function 14 checks whether a wireless signal of an acknowledgement (ACK) sent from a destination node in response to wireless transmission of each communication data has been detected or not.

The communication data buffer 15 is a memory used for temporarily storing communication data to be transmitted, which has been generated in the node the communication data buffer 15 belongs to, or communication data acquired from another node by intercepting wireless communication and not addressed to the node the communication data buffer 15 belongs to.

When a plurality of communication data acquired from other nodes by intercepting wireless communication and not addressed to the node the data synthesizing function 16 belongs to, the data synthesizing function 16 has a function of integrally synthesizing (aggregating) a plurality of communication data addressed to one and the same destination. That is, the total number of packets to be transmitted can be reduced by the synthesizing.

The communication timing management portion 17 fundamentally manages the node the communication timing management portion 17 belongs to, so that the node starts transmission operation of wireless communication at fixed time intervals. The communication timing management portion 17 also has a function of automatically changing the transmission timing of the node the communication timing management portion 17 belongs to, in accordance with a result of wireless communication performed by another node at an earlier timing. For example, when the node the communication timing management portion 17 belongs to performs relay operation of a wireless signal, the transmission timing of the node is shifted to be later (see S02 in FIG. 3) in order to enhance the frequency with which the node acquires and synthesizes a plurality of communication data and then sends out the synthesized communication data. On the other hand, when the node the communication timing management portion 17 belongs to is a communication data generation node, the transmission timing of the node is shifted to be earlier (S01).

Specifically, for example, assume that a communication protocol of CSMA/CA is used. In this case, when the communication timing management portion 17 automatically adjusts the length of back-off time, proper management of the transmission timing can be attained.

The interface 18 has a function of outputting the contents of received communication data to an on-vehicle device (such as an ECU) connected to the wireless communication terminal 10 in the node the interface 18 belongs to. On the other hand, the interface 19 has a function of, for example, periodically inputting data of a signal outputted from an on-vehicle device (such as a switch or a sensor) connected to the wireless communication terminal 10 in the node the interface 19 belongs to, and generating communication data and a transmission request thereof.

<Operation Example of Wireless Communication Terminal>

The wireless communication terminal 10 shown in FIG. 5 is disposed in a position of each node to form a communication system of a wireless network as shown in FIG. 1. In this case, operation as shown in FIG. 3 can be performed. For example, when the node the wireless communication terminal 10 is disposed is the node N2 generating communication data D2, the data synthesizing function 16 automatically adjusts the transmission timing of the node N2. Accordingly, transmitting a wireless signal of the communication data D2 from the node N2 can be started immediately after communication of communication data D1 in another node is terminated or ends in failure. That is, the transmission operation of the node N2 serving as a data generation node is prioritized over the transmission of the node N3 serving as a data relay node.

When the node the wireless communication terminal 10 is disposed is the node N3 relaying communication data, the data synthesizing function 16 automatically adjusts the transmission timing of the node N3. Accordingly, the node N3 is controlled to start relay operation later than the node N2 transmits as a data generation node. Accordingly, the node N3 can perform relay after the communication of the communication data D1 in the node N1 is terminated or ended in failure and further the communication of the communication data D2 in the node N2 is terminated or ended in failure. In addition, in this case, as a result that the node N3 intercepts wireless communication, the plurality of communication data D1 and D2 are held on the communication data buffer 15 of the node N3 at the time instant t13. Accordingly, the plurality of communication data D1 and D2 addressed to one and the same destination can be synthesized by the data synthesizing function 16, and the synthesized result can be transmitted at the time instant t13 as one set of communication data to be relayed.

<Modification of Wireless Network Configuration>

Figure 6:
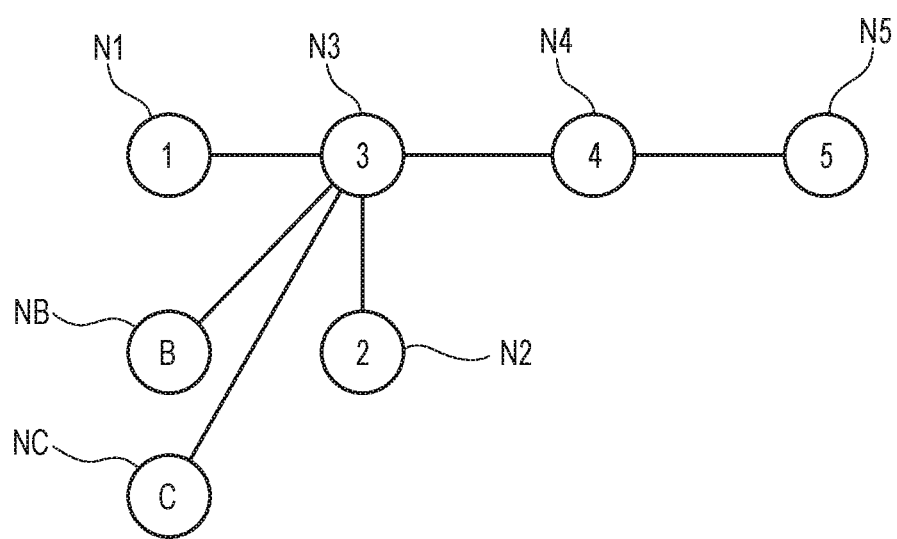
FIG. 6 is a block diagram showing a configuration example of a wireless network in the communication system.

FIG. 6 shows a configuration example of a wireless network of a communication system.

In the wireless network shown in FIG. 6, assume that nodes NB and NC are further present in addition to the nodes N1 to N5 shown in FIG. 1. In addition, assume that wireless communication terminals are provided in the nodes NB and NC respectively so that wireless communication can be established between the node N3 and each of the nodes NB and NC.

In the wireless network configuration shown in FIG. 6, when the node N2 fails in communication, communication can be performed to relay, to the destination node N5, the communication data D2 acquired by the node NB located near the node N2 and intercepting the communication of the node N2. In addition, when the node NB fails in communication, communication can be performed to relay, to the destination node N5, the communication data D2 acquired by the node NC intercepting the communication of the node NB. In addition, when the node NB or NC relays the communication data, it is also assumed that the transmission timing is adjusted so that a plurality of communication data (D1 and D2) addressed to the same destination are synthesized and transmitted in the same manner as in the node N3.

<Advantage of Wireless Communication Terminal and Communication Control Method>

In the aforementioned communication system, the communication timing management portion 17 in each wireless communication terminal 10 automatically adjusts the transmission timing of the node the communication timing management portion 17 belongs to. Accordingly, it is possible to reduce the load on the wireless network, that is, the volume of traffic, and it is also possible to suppress a delay in communication. That is, the transmission timing in the node N2 serving as the data generation node is made earlier (S01) as shown in FIG. 3, so that it is possible to prevent a delay in data transmission. In addition, the transmission timing in the node N3 serving as the data relay node is made later than in the data generation node (S02), so that communication data tend to be collected in the data relay node during relay operation. As a result, the frequency with which data are synthesized to reduce the number of transmission packets can be enhanced in the data relay node, so that the volume of traffic sent onto the network can be reduced. In addition, the timing of transmission can be adjusted uniquely to each node. Accordingly, even when the number of wireless communication terminals 10 connected to the wireless network increases, suitable transmission control can be performed independently of the number of terminals.

In addition, the wireless communication terminal 10 in the data relay node intercepts communication between other nodes to thereby control the communication timing. It is therefore unnecessary to form the network into a hierarchical structure, and it is not necessary to build a parent-child relation between terminals performing communication in advance. In addition, due to no use of the hierarchical structure, the direction of communication for aggregating data is not restricted.

Second Embodiment

In a wireless communication terminal 10B according to a second embodiment, the following points of the wireless communication terminal 10 according to the first embodiment are improved.

For example, in the communication system shown in FIG. 6, data of packets transmitted from the nodes N1, N2, NB, NC, etc. to the node N5 etc. are relayed by the node N3 in accordance with necessity. Assume that control shown in FIGS. 2 to 4 is performed in the node N3. In this case, the node 3 overhears failure in communication in the node N1, but the node 3 does not relay and transmit the data immediately after then. The node 3 must wait data from other nodes such as the node N2. As a specific method for processing of this waiting, for example, one of the following methods may be assumed.

(1) The relay node transmits relay data after waiting to collect a fixed volume of relay data.
(2) The relay node performs relay transmission after a fixed time has passed.

However, the aforementioned method (1) has the following problem. That is, in the condition that a small volume of data are generated in the communication system, it takes much time to accumulate data in the relay node. Thus, it takes much time to start relay transmission. Therefore, the relay elongates the time required until the data from the transmission source reaches the destination.

On the other hand, the aforementioned method (2) has the following problem. That is, in the condition that a small volume of data are generated in the communication system, in spite of the special transmission waiting in the relay node, the effect of improving the data transmission efficiency is low in comparison with the wait time.

Actually, an application of a wireless communication system used on a vehicle faces the following condition. For example, in the case of seat sensors, the number of sensors in operation changes in accordance with the actual number of passengers. For example, in a vehicle where only one driver rides, the number of sensors in operation is only one.

In an environment where six passengers ride on a vehicle mounted with three-row seats, such as a minivan, six or more sensors are operating simultaneously. In addition, when the number of passengers changes due to passengers getting on and off, the number of sensors in operation also changes. Accordingly, the frequency and number of data transmitted on the network of the wireless communication system on the vehicle and the frequency and number of data relayed on the same network are changed largely in accordance with circumstances.

<Configuration Example of Wireless Communication Terminal>

Figure 7:
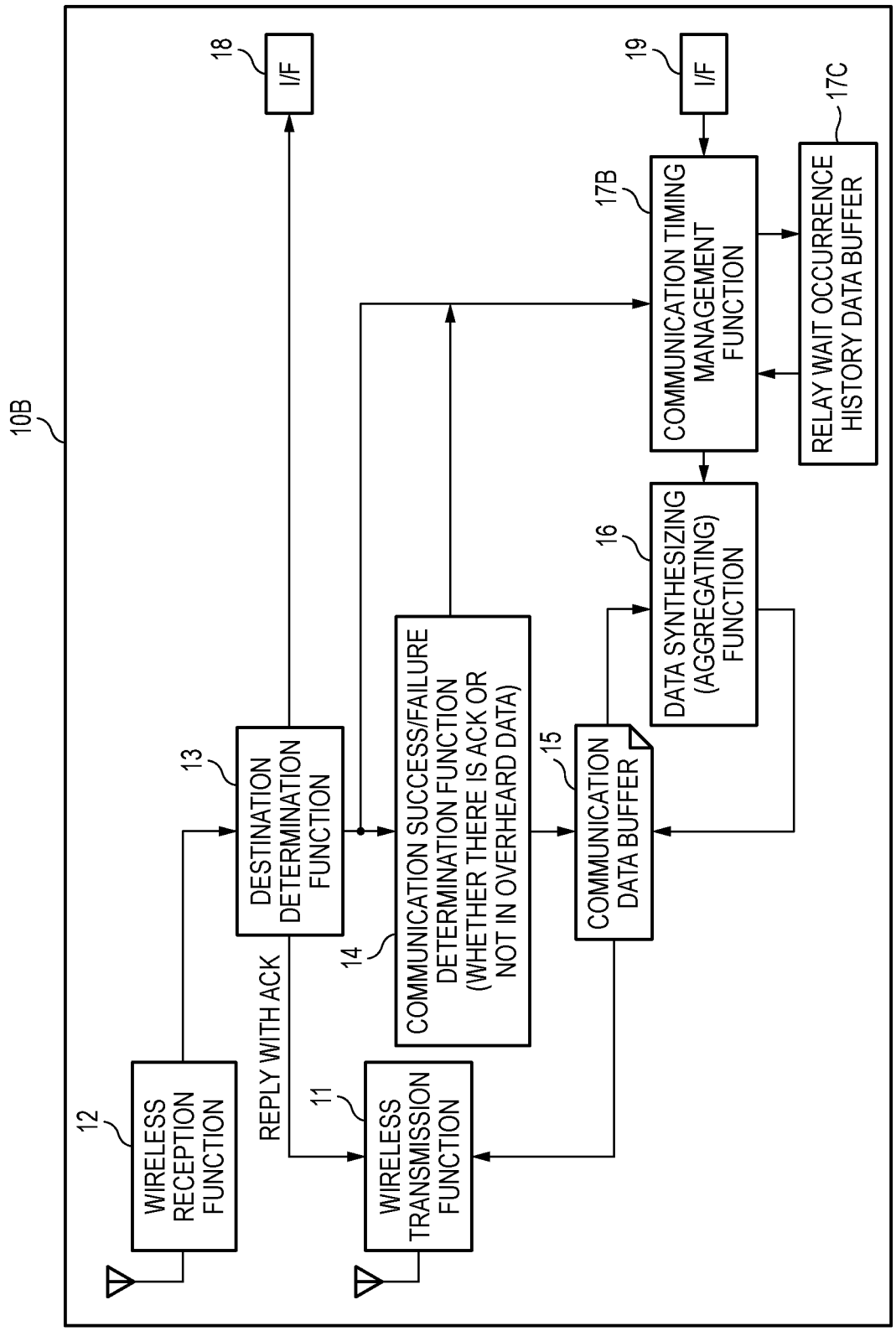
FIG. 7 is a block diagram showing main constituent elements of a wireless communication terminal according to a second embodiment of the invention.

FIG. 7 shows main constituent elements of the wireless communication terminal 10B according to the second embodiment of the invention.

The wireless communication terminal 10B shown in FIG. 7 is a modification of the wireless communication terminal 10 shown in FIG. 5. The wireless communication terminal 10B has a history data buffer 17C in addition to constituent elements equivalent to those of the aforementioned wireless communication terminal 10. In addition, a communication timing management portion 17B in FIG. 7 has a different function from that of the communication timing management portion 17 according to the first embodiment, as will be described below.

The history data buffer 17C records and holds history data about occurrence of relay waiting in the past in the wireless communication terminal 10B located in a node engaging in relay. Specifically, the history data buffer 17C records and holds information such as the time taken until the relay node starts relay operation after first overhearing communication data.

The fundamental function of the communication timing management portion 17B is the same as that of the aforementioned wireless communication terminal 10. However, the communication timing management portion 17B further has the following function. That is, the communication timing management portion 17B acquires, from the history data buffer 17C, data about the history of relay operation so far, and reflects the acquired data on relay control in the next time. For example, the communication timing management portion 17B calculates the wait time until the next relay transmission or the number of data to be collected, based on the past wait time or the past number of synthesized (aggregated) data. A specific example of a calculation formula will be shown below.

$$Wi+1=T0+\Delta T+T\alpha \quad (1)$$

T0=Wi: actual result in this time
ΔT=(Wi−Wi−1): change in actual result
Tα=1: adjustment factor for preventing state transition from stagnating
Wi: wait time in ith (this time) communication
Wi+1: wait time in next communication
Wi−1: wait time in previous communication Incidentally, the aforementioned equation (1) expresses the wait time of communication, but the wait time may be replaced directly by the number of data to be synthesized by the data synthesizing function 16. In addition, although it is assumed to perform linear prediction in the aforementioned equation (1), predictive calculation based on a quadratic function or a cubic function may be performed.

The communication timing management portion 17B repeatedly calculates the wait time or the number of data to be collected, which expresses a condition of control, for example, based on the aforementioned equation (1). The communication timing management portion 17B manages the data synthesizing function 16 to start relay communication when the condition is satisfied. In addition, in accordance with the previous communication result in the terminal, the communication timing management portion 17B dynamically changes the communication timing (data transmission timing) of the terminal the communication timing management portion 17B belongs to.

<Operation Example of Wireless Communication Terminal>

Figure 8:
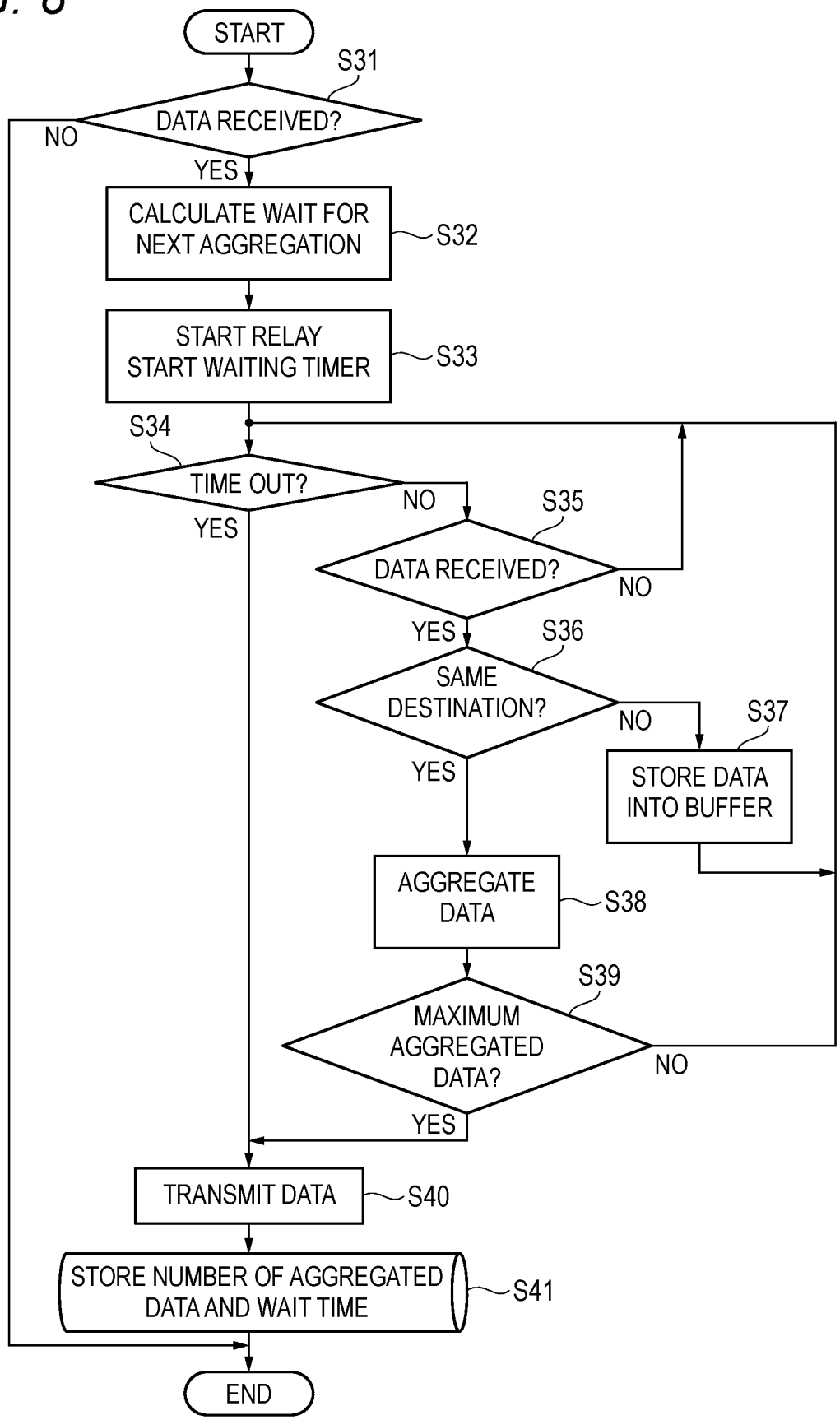
FIG. 8 is a flow chart showing a characteristic operation in the wireless communication terminal shown in FIG. 7.

FIG. 8 shows an example of main operation in each wireless communication terminal according to the second embodiment of the invention. That is, wireless communication terminals 10B carrying out the operation of FIG. 8 are, for example, connected to relay positions of the nodes N1 to N5 shown in FIG. 1 respectively so as to form a communication system. Thus, the characteristic operation in the second embodiment can be achieved.

The operation shown in FIG. 8 shows only the relay operation of a wireless signal in the wireless communication terminal 10B. The transmission operation or the reception operation can be also performed by the operation shown in FIG. 4. Accordingly, the wireless communication terminal 10B carrying out the operation of FIG. 8 can be used as a data relay node such as the node N3 or N4 shown in FIG. 1. The operation of FIG. 8 will be described below.

When the wireless communication terminal 10B serving as a relay node receives (overhears), in S31, data transmitted from another node by wireless communication, the wireless communication terminal 10B refers to the contents of the history held by the history data buffer 17C and grasps the condition of data synthesized in the past by the data synthesizing function 16. In accordance with the result thereof, the wireless communication terminal 10B calculates, in S32, the wait time until relay transmission is started and the number of data to be collected. For example, suitable wait time or a suitable number of data to be collected can be calculated using the aforementioned equation (1).

The wireless communication terminal 10B in the relay node sets the value of the wait time calculated in S32 in a relay start waiting timer in S33, and starts timer operation.

The wireless communication terminal 10B in the relay node determines, in S34, whether the time is out or not in the relay start waiting timer starting in S33, that is, whether the wait time calculated in S32 has passed or not. The wireless communication terminal 10B moves to S40 when the time is out, and moves to S35 when the time is not out.

That is, the wireless communication terminal 10B in the relay node starts transmitting data to be relayed in S40 as soon as the wait time calculated in S32 has passed since the data to be relayed were received in S31.

In addition, the wireless communication terminal 10B in the relay node determines, in S35, whether new data have been received (overheard) or not, before the time is out in the relay start waiting timer. When new data have not been received, the wireless communication terminal 10B returns to S34 and repeats the same processings.

When new data have been received in S35 before the time is out in the relay start waiting timer, the wireless communication terminal 10B in the relay node confirms, in the next Step S36, the destination of the data received this time. When the destination of the data received this time is the same as that of the data received previously, the wireless communication terminal 10B moves to S38. When not the same, the wireless communication terminal 10B moves to S37.

That is, when there are a plurality of received data addressed to the same destination, the wireless communication terminal 10B moves to S39 after synthesizing (S38)

the plurality of data in the data synthesizing function 16. When new data addressed to another destination have been received, the received data are stored in the communication data buffer 15 in S37.

When the plurality of data have been synthesized in the data synthesizing function 16, the number of synthesized data is compared with a maximum value (upper limit value) thereof in S39. When the number of synthesized data reaches the maximum value, the wireless communication terminal 10B moves from S39 to S40, in which the wireless communication terminal 10B starts relay transmission of the synthesized data. When the number of synthesized data is smaller than the maximum value, the wireless communication terminal 10B returns from S39 to S34, and repeats the aforementioned processings.

After the relay transmission of the synthesized data in S40, the wireless communication terminal 10B in the relay node stores, in the history data buffer 17C in S41, the number of synthesized data (aggregated data) transmitted this time and the value of the wait time for the relay transmission calculated in S32 together with information identifying the destination node.

That is, in the wireless communication terminal 10B in the relay node, relay transmission of data is executed at the timing when the time-out in the relay start waiting timer is detected in S34 or at the timing when it is detected in S39 that the number of synthesized data reaches the maximum value.

<Description of Specific Example>

Figures 9, 10:
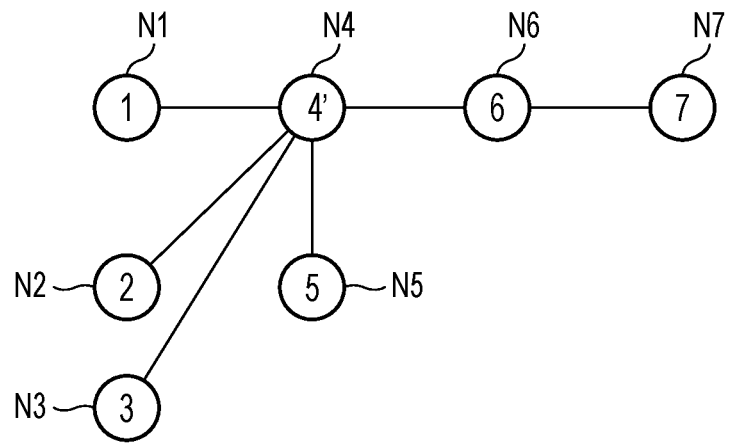
FIG. 9 is a block diagram showing a configuration example of a wireless network in a communication system.
FIG. 10 is a schematic view showing a configuration example of data on a history data buffer.

FIG. 9 shows a configuration example of the wireless network of the communication system. In addition, FIG. 10 shows a configuration example of data on the history data buffer 17C in the wireless communication terminal 10B in the relay node. Further, FIG. 11 shows changes with time about various numeric values in the wireless communication terminal 10B in the relay node by way of example.

Figure 11:
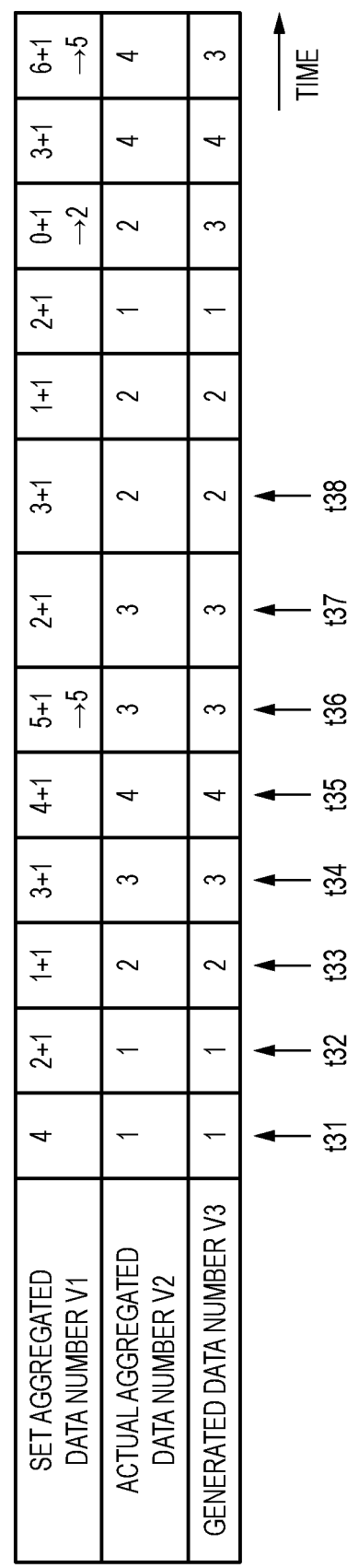
FIG. 11 is a schematic view showing changes with time about various numeric values in a relay node by way of example.

The contents shown in FIG. 10 and FIG. 11 indicate the situation in which the wireless communication terminal 10B in the node N4 in the wireless network shown in FIG. 9 relays data sent from another node, so as to deliver the relayed data to a destination.

For example, when the node N3 fails in direct communication of data transmitted to the node N1 in the wireless network of FIG. 9, the node N4 overhearing the communication can relay and transmit the data to deliver the data to the node N1. For example, when the node N7 fails in direct communication of data transmitted to the node N2, the node N4 overhearing the communication can relay and transmit the data to deliver the data to the node N2. For example, when each node N1, N2, N3, N5 fails in direct communication of data transmitted to the node N7, the node N4 overhearing the communication can relay and transmit the data to deliver the data to the node N7.

In the history data buffer 17C shown in FIG. 10, destination data Da, synthesized number data (aggregated number) Db, and relay wait time data Dc are recorded. The destination data Da indicates a destination of each reception data overheard for relay by a relay node such as the node N4. In this example, the history data buffer 17C holds the number of the destination node. The synthesized number data Db indicates an actual value of the number of data synthesized actually by the data synthesizing function 16 when a relay node such as the node N4 carries out relay transmission. The relay wait time data Dc corresponds to the length of wait time until the start of transmission set in the relay start waiting timer in S33 when a relay node such as the node N4 carries out relay transmission.

In the example shown in FIG. 10, it is assumed that data whose destinations are the nodes N1, N2, N7, N7, N7, N7, ... are received sequentially in one and the same relay node. Accordingly, values in the destination data Da of the history data buffer 17C are "1, 2, 7, 7, 7, 7, ...". In addition, values in the synthesized number data Db are "1, 1, 4, 3, 3, 2, ...", and values in the relay wait time data Dc are "1, 1, 4, 3, 2, 2, ...". Incidentally, the value "1" in the synthesized number data Db means the number of data is 1 and synthesizing is not performed. However, here, the value "1" is also regarded as a synthesized number.

FIG. 11 shows changes with time about a synthesized number set value (set aggregated number) V1, a synthesized number actual value (actual aggregated number) V2, and a generated data number V3 in the wireless communication terminal 10B in the relay node by way of example. The synthesized number set value V1 is a value calculated in S32 based on the aforementioned equation (1) and so on. The synthesized number set value V1 corresponds to a maximum aggregated number value to be compared in S39. The synthesized number actual value V2 is an actual value of the number of data actually synthesized by the data synthesizing function 16 during relay transmission. The synthesized number actual value V2 is included in the contents stored in S41. In addition, the generated data number V3 indicates the number of data actually generated during relay transmission in the relay node.

In the example shown in FIG. 11, the initial value of the synthesized number set value V1 is "4". In addition, the upper limit value of the synthesized number set value V1 is set at "5", and the lower limit value thereof is set at "2". In addition, the value of the synthesized number set value V1 is expressed to be divided into "T0+ΔT" and "Tα" in the aforementioned equation (1).

At a time instant t31 in FIG. 11, the synthesized number set value V1 is the initial value "4", the synthesized number actual value V2 is "1", and the generated data number V3 is "1". At a time instant t32, the synthesized number set value V1 is "2+1", that is, "T0+ΔT" is "2" and "Tα" is "1". At a time instant t36, the calculated value of the synthesized number set value is "5+1", which exceeds the upper limit value "5". Therefore, the synthesized number set value in this case is corrected to the upper limit value "5".

The synthesized number set value V1 as shown in FIG. 11 can be set at a suitable value in accordance with circumstances by use of the history recorded on the history data buffer 17C, the aforementioned equation (1), and so on.

In the example shown in FIG. 11, the generated data number V3 changes as "1, 1, 2, 3, 4, 3, 3, 2, 2, 1, ...". Following the change, the synthesized number set value V1 dynamically changes as "4, 3, 2, 4, 5, 5, 3, 4, 2, ...". In accordance with the change of the synthesized number set value V1, the synthesized number actual value V2 also changes as "1, 1, 2, 3, 4, 3, 3, 2, ...". In addition, in the example shown in FIG. 11, the generated data number V3 and the synthesized number actual value V2 are substantially equal to each other at each time instant.

That is, it is understood that when a relay node relays and transmits data, the synthesized number set value V1 is automatically adjusted suitably in accordance with the generated data number V3 so that there is no useless wait time until the number of data overheard and received actually reaches the synthesized number set value V1. In addition, as the generated data number V3 increases, the synthesized number set value V1 also increases. Thus, the synthesized number actual value V2 increases. That is, during relay transmission, a plurality of data can be synthesized and transmitted efficiently so that the traffic on the wireless communication network can be reduced.

The wireless communication terminal 10B can grasp the history of a change in the synthesized number set value V1 or the synthesized number actual value V2 as shown in FIG. 11, from the contents of the history data buffer 17C. For example, at the timing changing from the time instant t31 to the time instant t32 in FIG. 11, it is understood that the synthesized number set value V1 is reduced from "4" to "3". This is reflected on ΔT in the aforementioned equation (1), and this is reflected in S32 for deciding the synthesized number set value V1 at the next time instant t33. The same thing can be applied to other timings.

Although both the synthesized number data Db and the relay wait time data Dc are stored in the history data buffer 17C in the example shown in FIG. 10, the control shown in FIG. 8 can be carried out only if one of the synthesized number data Db and the relay wait time data Dc is stored in the history data buffer 17C. In addition, as for one of the synthesized number data Db and the relay wait time data Dc, either the result calculated in S32 or the actual value where the result of data transmitted actually in S40 is reflected may be stored in the history data buffer 17C. In addition, the actual value of the generated data number V3 shown in FIG. 11 may be stored in the history data buffer 17C, and the stored value may be used.

According to the wireless communication terminal and the communication control method according to the aforementioned second embodiment, the wait time for relay transmission can be automatically adjusted suitably in accordance with the condition of actually generated data to be relayed. In addition, it is not necessary to wait for a fixed time until a fixed volume of data are collected. Therefore, in the condition where data are not generated so much, relay transmission can be started in a short time. On the other hand, in an environment where data are generated much, the number of data to be synthesized for relay can be increased to establish efficient communication.

Here, the features of the wireless communication terminal and the communication control method according to the aforementioned embodiments of the invention will be summarized and listed briefly in the following paragraphs [1] to [7].

[1] A wireless communication terminal (10) that includes a function (wireless reception function 12) of receiving a wireless signal, a function (wireless transmission function 11) of transmitting a wireless signal, and a function (communication data buffer 15) of relaying contents of a received wireless signal and resending the contents through a wireless signal, and that can be connected to a predetermined wireless network, the wireless communication terminal including:

a data synthesizing portion (data synthesizing function 16) that synthesizes a plurality of data and sends the synthesized data when the data should be relayed to one and the same destination; and a transmission timing management portion (communication timing management portion 17) that transmits data in accordance with a transmission timing determined uniquely to the terminal, and changes the transmission timing to promote concentration of predetermined data on a data relay node on the wireless network.

[2] A wireless communication terminal according to the aforementioned paragraph [1], wherein:

when data addressed to another node and needing to be relayed are received and stored on a node the transmission timing management portion belongs to, the transmission timing management portion changes the transmission timing (S18) and makes length of a transmission wait time in the data relay node longer than at least that in a data generation node (S01, S02).

[3] A wireless communication terminal according to the aforementioned paragraph [1] or [2], wherein:

the node the transmission timing management portion belongs to is a data generation node that do not have to be relayed, and the transmission timing management portion shifts the transmission timing forward (S01) when detecting failure in wireless communication between another first node and another second node.

[4] A wireless communication terminal according to any one of the aforementioned paragraphs [1] through [3], further including:

a data buffer (communication data buffer 15) that temporarily holds corresponding received data as a target to be relayed (S15) when failure in wireless communication between another first node and another second node is detected (S12, S14).

[5] A wireless communication terminal according to any one of the aforementioned paragraphs [1] through [4], further including:

an actual value recording portion (history data buffer 17C) that records and holds past actual values relating to at least one of the number of data synthesized by the data synthesizing portion (synthesized number actual value V2), the number of generated data (V3), and a transmission wait time in the transmission timing management portion (synthesized number set value V1, synthesized number data Db, relay wait time data Dc); wherein:

the transmission timing management portion dynamically reflects the actual values held by the actual value recording portion and a change thereof on at least one of length of the transmission wait time and a reference value of the number of data to be synthesized by the data synthesizing portion (S32, S33).

(6) A communication control method for controlling a wireless network formed by at least three wireless communication terminals (10, nodes N1 to N5) including at least a first node, a second node and a third node, the communication control method including the steps of:

making the third node intercept wireless communication between the first node and the second node;

temporarily holding, on the third node, corresponding communication data as a target to be relayed (S15) when the third node detects failure in wireless communication between the first node and the second node (S14);

changing a transmission timing of the third node holding the communication data (S18); and making the third node synthesize (S22) and transmit (S23) a plurality of communication data held by the third node when the communication data are addressed to one and the same destination.

[7] A communication control method according to the aforementioned paragraph [6], further including the steps of:

recording and holding past actual values relating to at least one of the number of data synthesized in the third node, the number of generated data, and a transmission wait time (S41); and dynamically reflecting the actual values and a change thereof on at least one of length of the transmission wait time in the third node and a reference value of the number of data to be synthesized (S32).

What is claimed is:

1. A wireless communication terminal that includes a function of receiving a wireless signal, a function of transmitting the wireless signal, and a function of relaying contents of a received wireless signal and resending the contents through the wireless signal, and that is configured to be connected to a predetermined wireless network, the wireless communication terminal comprising:
- a data synthesizing portion that synthesizes a plurality of data and sends the synthesized data when the synthesized data should be relayed to one and same destination; and
- a transmission timing management portion that transmits the synthesized data in accordance with a transmission timing unique to the wireless communication terminal, and changes the transmission timing to promote concentration of predetermined data on a data relay node on the predetermined wireless network,
- wherein when data addressed to another node and needing to be relayed are received and stored on a node the transmission timing management portion belongs to, the transmission timing management portion changes the transmission timing and makes length of a transmission wait time in the data relay node longer than at least that in a data generation node.

2. A wireless communication terminal that includes a function of receiving a wireless signal, a function of transmitting the wireless signal, and a function of relaying contents of a received wireless signal and resending the contents through the wireless signal, and that is configured to be connected to a predetermined wireless network, the wireless communication terminal comprising:
- a data synthesizing portion that synthesizes a plurality of data and sends the synthesized data when the synthesized data should be relayed to one and same destination; and
- a transmission timing management portion that transmits the synthesized data in accordance with a transmission timing unique to the wireless communication terminal, and changes the transmission timing to promote concentration of predetermined data on a data relay node on the predetermined wireless network,
- wherein a node the transmission timing management portion belongs to is a data generation node that does not have to be relayed, and the node the transmission timing management portion belongs to shifts the transmission timing forward when detecting failure in wireless communication between another first node and another second node.

3. A wireless communication terminal according to claim 1, further comprising:
- a data buffer that temporarily holds corresponding received data as a target to be relayed when failure in wireless communication between another first node and another second node is detected.

4. A wireless communication terminal according to claim 1, further comprising:
- an actual value recording portion that records and holds past actual values relating to at least one of a number of data synthesized by the data synthesizing portion, a number of generated data, and a transmission wait time in the transmission timing management portion,
- wherein the transmission timing management portion dynamically reflects the actual values held by the actual value recording portion and a change thereof on at least one of length of the transmission wait time and a reference value of the number of data to be synthesized by the data synthesizing portion.

5. A communication control method for controlling a wireless network formed by at least three wireless communication terminals including at least a first node, a second node and a third node, the communication control method comprising steps of:
- making the third node intercept wireless communication between the first node and the second node;
- temporarily holding, on the third node, corresponding communication data as a target to be relayed when the third node detects failure in wireless communication between the first node and the second node;
- changing a transmission timing of the third node holding the communication data;
- making the third node synthesize and transmit a plurality of communication data held by the third node when the communication data are addressed to one and same destination;
- recording and holding past actual values relating to at least one of a number of data synthesized in the third node, a number of generated data, and a transmission wait time; and
- dynamically reflecting the actual values and a change thereof on at least one of length of the transmission wait time in the third node and a reference value of the number of data to be synthesized.

* * * * *